United States Patent
Mizuno et al.

(10) Patent No.: US 8,263,179 B2
(45) Date of Patent: Sep. 11, 2012

(54) PROCESS FOR PRODUCING ZEOLITE SEPARATION MEMBRANE

(75) Inventors: Takehito Mizuno, Omitama (JP); Yumiko Katakura, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 805 days.

(21) Appl. No.: 12/280,231

(22) PCT Filed: Feb. 23, 2007

(86) PCT No.: PCT/JP2007/053389
§ 371 (c)(1),
(2), (4) Date: Apr. 20, 2009

(87) PCT Pub. No.: WO2007/097417
PCT Pub. Date: Aug. 30, 2007

(65) Prior Publication Data
US 2010/0233364 A1    Sep. 16, 2010

(30) Foreign Application Priority Data
Feb. 24, 2006    (JP) ................. 2006-048829

(51) Int. Cl.
*B05D 5/00*    (2006.01)

(52) U.S. Cl. ........ 427/244; 427/245; 427/247; 210/767; 210/500.25; 423/709

(58) Field of Classification Search ............... 427/244, 427/245, 247; 210/767, 500.25; 423/709
See application file for complete search history.

(56) References Cited

U.S. PATENT DOCUMENTS

| | | |
|---|---|---|
| 3,662,563 A | 5/1972 | Sudmeier |
| 5,554,286 A | 9/1996 | Okamoto et al. |
| 6,620,320 B1 | 9/2003 | Hying et al. |
| 6,767,384 B1 | 7/2004 | Vu et al. |
| 7,798,334 B2 * | 9/2010 | Mizuno et al. ........... 210/500.22 |
| 2001/0056215 A1 | 12/2001 | Verduijn et al. |
| 2003/0044350 A1 | 3/2003 | Lam et al. |

(Continued)

FOREIGN PATENT DOCUMENTS

EP    0976440 A    2/2000

(Continued)

OTHER PUBLICATIONS

Extended European Search Report on Application No. 07 71 4860 dated on Apr. 26, 2010.

(Continued)

*Primary Examiner* — Frederick Parker
*Assistant Examiner* — Alex Rolland
(74) *Attorney, Agent, or Firm* — Sughrue Mion, PLLC

(57) ABSTRACT

A process for producing a zeolite separation membrane having a porous support containing alumina as a main component and, provided on a surface and within pores of the porous support, a zeolite layer, comprising the seed crystal adhering step of adhering USY zeolite crystal as a seed crystal on a surface and within pores of the porous support; the basis material forming step of bringing a reactant liquid containing silicon and aluminum into contact with the porous support and heating the reactant liquid to thereby obtain a zeolite separation membrane basis material; and the basis material separating step of separating the zeolite separation membrane basis material from the reactant liquid to thereby obtain a zeolite separation membrane. By this process for producing a zeolite separation membrane, there can be produced an FAU zeolite separation membrane capable of satisfactory separation of a mixture of organic solvent and water.

9 Claims, 1 Drawing Sheet

U.S. PATENT DOCUMENTS

| | | |
|---|---|---|
| 2005/0067344 A1 | 3/2005 | Tanaka et al. |
| 2006/0011535 A1 | 1/2006 | Ikeda et al. |
| 2007/0265484 A1 | 11/2007 | Li et al. |
| 2009/0130000 A1 | 5/2009 | Inoue |
| 2009/0220414 A1 | 9/2009 | Mizuno |
| 2009/0269276 A1 | 10/2009 | Chida et al. |

FOREIGN PATENT DOCUMENTS

| | | |
|---|---|---|
| JP | 63-291809 A | 11/1988 |
| JP | 7-109116 A | 4/1995 |
| JP | 8-257302 A | 10/1996 |
| JP | 8257301 A | 10/1996 |
| JP | 8-318141 A | 12/1996 |
| JP | 10-36113 A | 2/1998 |
| JP | 10-114516 A | 5/1998 |
| JP | 10212117 A | 8/1998 |
| JP | 2000-042387 A | 2/2000 |
| JP | 2001097715 A | 4/2001 |
| JP | 2002-18247 A | 1/2002 |
| JP | 2002-058972 A | 2/2002 |
| JP | 2003-326142 A | 11/2003 |
| JP | 2004-082008 A | 3/2004 |
| JP | 2004-123415 A | 4/2004 |
| JP | 2005-125313 A | 5/2005 |
| JP | 2006-008510 A | 1/2006 |
| JP | 2006-159031 A | 6/2006 |
| WO | 96/01683 A1 | 1/1996 |
| WO | 02/38258 A1 | 5/2002 |
| WO | 2005/014444 A1 | 2/2005 |
| WO | WO 2005014481 A1 * | 2/2005 |
| WO | 2006/059394 A1 | 6/2006 |
| WO | WO 2006059394 A1 * | 6/2006 |

OTHER PUBLICATIONS

Office Action issued May 17, 2011, in U.S. Appl. No. 11/916,765, filed Dec. 6, 2007, to Soushi Inoue.

Burriesci, N., et al., "Influence of Temperature on Hydrothermal Synthesis of Zeolites from Lipari Pumice," Materials Chemistry and Physics, Apr. 1983, pp. 305-314, vol. 8, No. 4, Elsevier Sequoia, Netherlands, XP022846979.

Extended European Search Report dated Oct. 5, 2009 on European Application No. 06781804.7.

International Search Report dated Jul. 25, 2006 on Application No. PCT/JP2006/311314.

Li et al., "SAPO-34 membranes for CO2/CH4 separation," Journal of Membrane Science, 241:121-135 (2004).

International Preliminary Report on Patentability dated Mar. 13, 2008 in PCT/JP2006/316174.

Extended European Search Report dated Oct. 5, 2008 in European Application No. 06782787.3.

International Preliminary Report on Patentability.

* cited by examiner

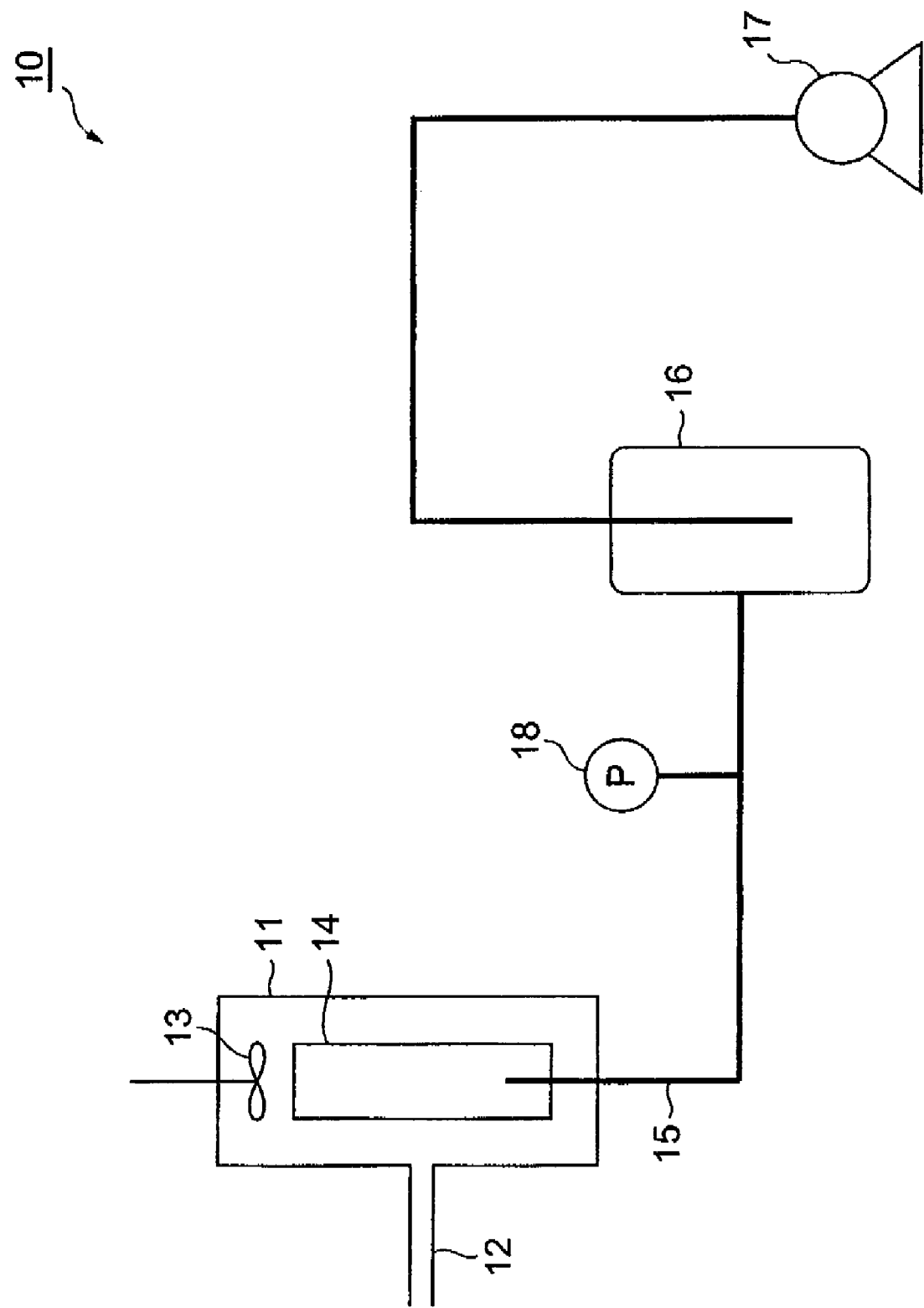

US 8,263,179 B2

PROCESS FOR PRODUCING ZEOLITE SEPARATION MEMBRANE

TECHNICAL FIELD

The present invention relates to a process for production of a zeolite separation membrane.

BACKGROUND ART

A zeolite separation membrane having a porous support and a zeolite layer (zeolite membrane) formed on its surface and inside its pores is widely used as a means of separation of a specific liquid component in a liquid mixture. Among zeolite separation membranes used for separation of a liquid mixture, faujasite (FAU) zeolite separation membranes, which have a layer of FAU zeolite crystals (Y- or X-type zeolite crystals), are of particular interest because of, for example, the facts that they can be used for separation of a mixture of different organic solvents, that they are excellent in durability, heat resistance, acid resistance and water resistance, and that they are safe to the human body.

As an example of a conventional process for production of an FAU zeolite separation membrane, there is known a process in which: an aluminosilicate gel having a prescribed composition is aged for a prescribed time, and then a porous support to which NaY zeolite crystals are attached is immersed in the gel and the hydrothermal synthesis is performed at a prescribed temperature for a prescribed time (see Patent document 1). There is also known a process in which: a porous support to which NaX zeolite crystals are attached is immersed in a reaction solution having a prescribed composition and is heated for reaction, and then it is immersed in distilled water (see Patent document 2).

Patent document 1: Japanese Patent Application Laid-Open No. 8-257301
Patent document 2: Japanese Patent Application Laid-Open No. 10-212117

DISCLOSURE OF THE INVENTION

Problem to be Solved by the Invention

FAU zeolite separation membranes obtained by the conventional processes (for example, processes described in Patent documents 1 and 2), however, are not capable of satisfactorily separating water from a mixture of organic solvent and water. Because of the aforementioned features of an FAU zeolite separation membrane, it is believed that there is a very high demand for an FAU zeolite separation membrane that can accomplish satisfactory separation of a mixture of organic solvent and water.

It is therefore an object of the present invention to provide a process for production of an FAU zeolite separation membrane that can accomplish satisfactory separation of a mixture of organic solvent and water.

Means for Solving the Problem

As a result of much diligent research directed toward achieving the object stated above, the present inventors have unexpectedly found that an FAU zeolite separation membrane with sufficiently high separation performance even for a mixture of alcohol and water can be obtained by using a porous support in which USY (ultrastable Y) zeolite crystals are attached to the surface and inside the pores during hydrothermal synthesis, and the invention has been completed based on this finding.

Specifically, the present invention provides a process for production of a zeolite separation membrane having a porous support composed mainly of alumina and a zeolite layer formed on the surface of, and inside the pores of, the porous support, the process comprising:

a seed crystal-attaching step in which USY zeolite crystals are attached as seed crystals to the surface of, and inside the pores of, the porous support;

a crude product-forming step in which: the porous support is contacted with a reaction solution containing silicon and aluminum, and the reaction solution is heated to form a crude product of the zeolite separation membrane; and a crude product-separating step in which the crude product of the zeolite separation membrane is separated from the reaction solution to afford the zeolite separation membrane.

The phrase "composed mainly of alumina" as used herein means that the alumina content of the porous support is at least 90% with respect to the total weight of the porous support. Also, the terms "USY zeolite crystal" and "USY crystal" refer to an FAU zeolite crystal wherein the molar ratio of silicon to aluminum (Si/Al) is 3 or greater.

The production process described above makes it possible to obtain an FAU zeolite separation membrane having a dense layer of FAU zeolite crystals and having sufficiently high separation performance. As a possible reason for that, the following may for example be mentioned.

If a zeolite separation membrane is produced using a porous support composed mainly of alumina, aluminum (Al) elutes from the porous support into the reaction solution during hydrothermal synthesis. Thus, in conventional FAU zeolite separation membrane production processes that employ, as seed crystals, FAU crystals (NaY crystals, NaX crystals and the like) with an Si/Al ratio of less than 3, the Si/Al ratio in the reaction solution is altered near the surface of, and in the pores of, the porous support, thus preventing formation of a zeolite layer with a desired compositional ratio (Si/Al). However, according to the production process of the invention that employs, as seed crystals, USY crystals (Si/Al: 3 or greater), which are FAU crystals with a higher Si/Al ratio than crystals used in the prior art, not only does aluminum elute from the porous support, but silicon (Si) also elutes from the seed crystals during hydrothermal synthesis, thus maintaining a relatively constant Si/Al ratio in the reaction solution near the surface of, and in the pores of, the porous support. Consequently, zeolite crystals with a desired compositional ratio (Si/Al) are more easily formed, and a denser zeolite layer with higher crystallinity can thus be formed.

The zeolite separation membrane obtained by the production process described above is capable of satisfactorily separating a liquid mixture, such as a mixture of organic solvent and water. It is also capable of separating a liquid mixture at a remarkably fast rate.

Also, the zeolite separation membrane obtained by the production process has a high Si/Al ratio in the zeolite crystals and is excellent in durability, heat resistance, acid resistance, water resistance and the like, compared to A-type zeolite separation membranes, for example. Specifically, even if the membrane is used at high temperature (100° C. to 300° C.) or used frequently, it is not easily deteriorated. In addition, even if the liquid mixture to be separated is contaminated by acid or the proportion of water in the liquid mixture is high (for example, 50% or more), it is not easily deteriorated.

Moreover, since the zeolite crystals formed in the zeolite separation membrane obtained by the production process are FAU crystals having an octahedral structure, its use poses little risk to the human body, and for example, the risk of causing lung diseases such as emphysema in humans are very low, compared to T-type zeolite separation membranes, which have needle-like T-type zeolite crystals.

The use of NaY crystals or NaX crystals as seed crystals for production of an FAU zeolite separation membrane is common technical knowledge for those skilled in the art. USY crystals have conventionally been considered unsuitable as seed crystals. Consequently, it would be very difficult for a person skilled in the art to conceive the idea of using USY crystals as seed crystals for production of an FAU zeolite separation membrane as in the production process of the invention. Naturally, then, the present inventors are the first to discover that use of USY crystals as seed crystals makes it possible to obtain an FAU zeolite separation membrane with sufficiently high separation performance even for mixtures of organic solvent and water.

Effects of the Invention

The present invention provides a process for production of an FAU zeolite separation membrane that can accomplish satisfactory separation of a mixture of organic solvent and water.

BRIEF DESCRIPTION OF THE DRAWINGS

FIG. 1 is a schematic diagram of a pervaporation (PV) test apparatus.

EXPLANATION OF REFERENCE NUMERALS

10: Pervaporation test apparatus; 11: container; 12: conduit; 13: stirrer, 14: zeolite separation membrane; 15: conduit; 16: liquid nitrogen trap; 17: vacuum pump; 18: vacuum gauge.

Best Modes for Carrying Out The Invention

Preferred embodiments of the present invention will now be explained.

[Zeolite Separation Membrane Production Process]

The zeolite separation membrane production process of the invention is a process for production of a zeolite separation membrane having a porous support composed mainly of alumina and a zeolite layer formed on the surface of, and inside the pores of, the porous support, the process comprising at least a seed crystal-attaching step, crude product-forming step and crude product-separating step as hereinafter described.

The alumina may be $\alpha$-alumina, $\beta$-alumina or $\gamma$-alumina, with $\alpha$-alumina being preferred from the viewpoint of physical and chemical stability. As components other than alumina that may be contained in the porous support, there may be mentioned mullite, silica, titania, zirconia, stainless steel, nickel and the like.

(Seed Crystal-attaching Step)

In the zeolite separation membrane production process of the invention, a seed crystal-attaching step in which USY zeolite crystals are attached as seed crystals to the surface of, and inside the pores of, the porous support is first carried out.

By carrying out the seed crystal-attaching step, a layer of FAU zeolite crystals with high crystallinity and homogeneity and with high resistance to peeling is formed on the surface of, and inside the pores of, the porous support, thus causing the separation performance of the resultant FAU zeolite separation membrane to be sufficiently high.

The mean particle size of the USY crystals is preferably 1 nm to 1 $\mu$m and more preferably 1 $\mu$m to 0.4 $\mu$m. If the mean particle size of the USY crystals is less than 1 nm, formation of an inhomogeneous zeolite layer having numerous microcrystals and grain boundaries will be easy to occur compared to the case where the mean particle size is 1 nm to 1 $\mu$m. On the other hand, if the mean particle size of the USY crystals is greater than 1 $\mu$m, the layer of USY crystals attached to the porous support will be thick and growth of zeolite crystals will be difficult to occur except in the vicinity of the surface of the layer, compared to the case where the mean particle size is 1 nm to 1 $\mu$m. Also, attachment of USY crystals inside the pores of the porous support will be difficult to occur. Peeling of the formed zeolite layer will therefore tend to occur. If the mean particle size of the USY crystals is 1 nm to 0.4 $\mu$m, the homogeneity of the formed zeolite layer will be particularly high and peeling of the zeolite layer will be particularly difficult to occur.

As USY crystals there may be used any commercial products commonly used as acid catalysts or the like. USY crystals can be produced by a publicly known method, such as: a method wherein aluminum is extracted from NaY zeolite crystals by high-temperature steam treatment, or a method wherein aluminum is extracted together with the moisture occluded in the pores of NaY zeolite crystals by high-temperature treatment.

The mean pore size of the porous support is preferably 0.1 to 20 $\mu$m and more preferably 0.1 to 5 $\mu$m. If the mean pore size is less than 0.1 $\mu$m, attachment of USY crystals inside the pores of the porous support will be difficult to occur compared to the case where the mean pore size is 0.1 to 20 $\mu$m. On the other hand, if the mean pore size is greater than 20 $\mu$m, an increased number of defects (grain boundaries, cracks, pinholes and the like) will tend to be generated in the zeolite layer to be formed, compared to the case where the mean pore size is 0.1 to 20 $\mu$m. If the mean pore size is 0.1 to 5 $\mu$m, attachment of USY crystals inside the pores of the porous support will be particularly easy to occur and the number of defects generated in the formed zeolite layer will be notably reduced.

The porosity of the porous support is preferably 5% to 50% and more preferably 30% to 50%. A porosity of less than 5% will tend to lower the gas permeation rate and to reduce the permeation flux, compared to a porosity of 5% to 50%. On the other hand, a porosity of greater than 50% will tend to reduce the self-supporting property (mechanical strength) of the porous support, compared to a porosity of 5% to 50%. If the porosity is 30% to 50%, the permeation flux and mechanical strength of the resultant zeolite separation membrane will be particularly high.

The shape of the porous support may, for example, be tubular, cylindrical, hollow fibrous, plate-like, honeycomb-shaped or pelleted.

There are no particular restrictions on the size of the porous support, but if the shape is tubular, for example, a length of 2 to 200 cm, an inner diameter of 0.5 to 2 cm and a thickness of 0.5 to 4 mm is practical.

The attachment of USY crystals onto the porous support may be accomplished by, for example, contacting the porous support with a seed crystal slurry (liquid containing USY crystals) or rubbing USY crystals directly onto the porous support.

As methods for contacting the porous support with a seed crystal slurry, there may be mentioned: impregnation (method wherein the porous support is impregnated with the seed crystal slurry), spin coating (method wherein the seed crystal slurry is dropped and spin-coated onto the porous support), spray coating (method wherein the seed crystal slurry is sprayed onto the porous support), application, filtration, and the like. The length of time for which the porous support is kept contacted with the seed crystal slurry is preferably 0.5 to 60 minutes and more preferably 1 to 10 minutes. If the contact time is less than 0.5 minute, attachment of USY crystals will be difficult to occur compared to the case where the contact time is 0.5 to 60 minutes. On the other hand, if the contact time is more than 60 minutes, the layer of seed crystals attached to the porous support will be thick and growth of zeolite crystals will be difficult to occur except in the vicinity of the surface of the layer, compared to the case where the contact time is 0.5 to 60 minutes. Peeling of the formed zeolite layer will therefore tend to occur. If the contact time is 1 to 10 minutes, attachment of seed crystals to the porous support will be particularly easy to occur and peeling of the formed zeolite layer will be particularly difficult to occur.

The seed crystal slurry may be prepared by placing USY crystals in water, a water-containing lower alcohol or the like and stirring the resultant mixture. The USY crystals to be used for preparation of the seed crystal slurry are preferably microcrystals with a mean particle size of 1 nm to 1 μm. If such microcrystals are used, settling of USY crystals in the seed crystal slurry will be difficult to occur and the dispersion state of the USY crystals in the seed crystal slurry will be stable, compared to the case where other types of crystals are used. The concentration of USY crystals in the seed crystal slurry is preferably 0.01% to 20% by weight and more preferably 0.1% to 10% by weight. If the concentration of USY crystals is less than 0.01% by weight, attachment of USY crystals to the porous support will be difficult to occur compared to the case where the concentration is 0.01% to 20% by weight. On the other hand, if the concentration of USY crystals is greater than 20% by weight, the layer of USY crystals attached to the porous support will be thick and growth of zeolite crystals will be difficult to occur except in the vicinity of the surface of the layer, compared to the case where the concentration is 0.01% to 20% by weight. Peeling of the formed zeolite layer will therefore tend to occur. If the concentration of USY crystals is 0.1% to 10% by weight, attachment of USY crystals to the porous support will be particularly easy to occur and peeling of the formed zeolite layer will be particularly difficult to occur. The seed crystal slurry may also contain additives such as surfactants.

In the seed crystal-attaching step, the porous support and the USY crystals attached thereto are preferably dried after the USY crystals have been attached to the porous support. Drying of the porous support and USY crystals can further reinforce the attachment of the USY crystals. The drying is preferably performed at a temperature of no higher than 70° C. Drying at a temperature above 70° C. will increase the rate of evaporation of the solvent and promote aggregation of USY crystals, compared to drying at a temperature of 70° C. or below. The homogeneity of attachment of USY crystals will thus tend to be reduced. The drying is preferably a combination of room temperature drying and heated drying, because such a combination will shorten the heating time during drying.

(Crude Product-forming Step)

The seed crystal-attaching step is followed by a crude product-forming step in which: the porous support is contacted with a reaction solution containing silicon and aluminum, and the reaction solution is heated to form a crude product of the zeolite separation membrane.

The reaction solution to be used for the crude product-forming step is a liquid (or gel) containing zeolite raw material, and contains at least silicon and aluminum. The molar ratio of silicon to aluminum (Si/Al) in the reaction solution is preferably 1.8 to 12.5.

The reaction solution may be prepared by adding a mixture of silica source and alumina source to a solvent (such as water) and stirring the resultant mixture. As silica sources there may be mentioned alkali metal silicates such as sodium silicate, water glass and potassium silicate, as well as silica powder, silicic acid, colloidal silica, acid clay, kaolin, silicon alkoxides (aluminum isopropoxide, etc.) and the like. As alumina sources there may be mentioned aluminum salts such as aluminum hydroxide, sodium aluminate, aluminum sulfate, aluminum nitrate and aluminum chloride, as well as alumina powder, colloidal alumina and the like.

The total amount of silica source and alumina source used to prepare the reaction solution is preferably 50% to 99.5% by weight and more preferably 60% to 90% by weight with respect to the total weight of the reaction solution to be prepared. If the total content is less than 50% by weight, growth of the zeolite crystals will tend to be slow compared to the case where the total content is 50% to 99.5% by weight. On the other hand, if the total content is more than 99.5% by weight, formation of a homogeneous zeolite layer will be difficult to occur compared to the case where the total content is 50% to 99.5% by weight. If the total content is 60% to 90% by weight, the rate of zeolite layer formation will be notably increased and the homogeneity of the formed zeolite layer will be particularly high.

The reaction solution may also contain alkali metal or alkaline earth metal. The reaction solution that also contains alkali metal or alkaline earth metal may be prepared by adding alkali metal source or alkaline earth metal source to a liquid that contains silicon and aluminum and stirring the resultant mixture. As alkali metal sources there may be mentioned sodium chloride, potassium chloride and the like. As alkaline earth metal sources there may be mentioned calcium chloride, magnesium chloride and the like. An alkali metal silicate used as a silica source can also serve as an alkali metal source.

The reaction solution may further contain an additive such as a crystallization promoter. As crystallization promoters there may be mentioned tetrapropylammonium bromide, tetrabutylammonium bromide, tetrapropyl hydroxide, tetramethyl hydroxide, tetraethyl hydroxide and the like.

The contact between the porous support and reaction solution may be accomplished by, for example, immersing the porous support in the reaction solution.

In the crude product-forming step, the reaction solution is heated to raise its temperature to a prescribed temperature, during which the porous support and reaction solution are in contact. The prescribed temperature as referred to here is a temperature higher than 40° C., and although it may be appropriately set depending on the composition, properties, etc. of the reaction solution, it is preferably 90° C. to 130° C. in many cases.

After raising the temperature of the reaction solution to the prescribed temperature, the reaction solution is preferably held at this temperature for at least 2 hours. If the reaction solution is not held at the prescribed temperature for at least 2 hours, an increased number of defects will tend to be generated in the zeolite layer to be formed, compared to the case where it is held for at least 2 hours.

The heating of the reaction solution may be accomplished by, for example, supplying a heating medium (for example, water or water vapor) to a jacket provided around a container in which the reaction solution is housed, or to a spiral tube provided inside a container in which the reaction solution is housed.

(Crude Product-separating Step)

The crude product-forming step is followed by a crude product-separating step in which the crude product of the zeolite separation membrane is separated from the reaction solution to afford the zeolite separation membrane.

As methods for separating the crude product of the zeolite separation membrane from the reaction solution, there may be mentioned: a method wherein the crude product is lifted from the reaction solution; a method wherein only the reaction solution is removed through an outlet provided at the bottom section of the container; a method wherein the container housing the reaction solution is moved downward without moving the crude product; and the like.

The crude product-separating step is preferably followed by a separation membrane-washing step in which the obtained zeolite separation membrane is washed. In this step, unreacted substances, zeolite particles, amorphous components and the like which have been attached to the surface of the zeolite layer are removed. If the separation membrane-washing step is carried out, the separation performance of the resultant zeolite separation membrane will be high compared to the case where it is not carried out.

As methods for washing the zeolite separation membrane, there may be mentioned: a method wherein the surface of the zeolite layer is brushed with the zeolite separation membrane contacted with water; a method wherein ultrasonic waves are applied to the surface of the zeolite layer with the zeolite separation membrane immersed in water; and the like.

The crude product-separating step is preferably followed by a separation membrane-cooling step in which the zeolite separation membrane is cooled, either simultaneously with the separation membrane-washing step or before the separation membrane-washing step. If the separation membrane-cooling step is carried out, drying of the porous support will be difficult to occur and drying and hardening of the attached substances will be suppressed, compared to the case where it is not carried out.

As methods for cooling the zeolite separation membrane, there may be mentioned: a method wherein the zeolite separation membrane is immersed in water of low temperature (for example, 10° C. to 40° C.); a method wherein the zeolite separation membrane is sprayed with water of low temperature (for example, 10° C. to 40° C.); and the like.

[Zeolite Separation Membrane]

The present invention also provides a zeolite separation membrane obtainable by the production process described above. The zeolite separation membrane is an FAU zeolite separation membrane having a dense layer of FAU zeolite crystals and having sufficiently high separation performance, and, it is capable of satisfactorily separating a liquid mixture, such as a mixture of organic solvent and water. It is also capable of separating a liquid mixture at a remarkably fast rate. Moreover, it is excellent in durability, heat resistance, acid resistance, water resistance and the like, and it is safe to the human body.

Separation of a liquid mixture using the zeolite separation membrane may be accomplished by pervaporation (PV) or vapor permeation (VP). Use of the zeolite separation membrane makes it possible to accomplish separation of a liquid mixture at high temperature (100° C. to 300° C.), and therefore makes it possible to separate a liquid mixture more efficiently. In addition, a liquid mixture can be satisfactorily separated, even if the liquid mixture is contaminated by acid or the proportion of water in the liquid mixture is high (for example, 50% or more).

The separation performance of the zeolite separation membrane may be evaluated based on the separation factor. In the case of separation of ethanol and water, for example, the separation factor is the value expressed as $(B1/B2)/(A1/A2)$ where: the concentrations of water and ethanol in the mixture prior to separation are $A1\%$ by weight and $A2\%$ by weight, respectively, and the concentrations of water and ethanol in the liquid or gas permeating the zeolite separation membrane are $B1\%$ by weight and $B2\%$ by weight, respectively. A larger separation factor can be judged to mean that the separation performance is higher.

The practical utility of the obtained zeolite separation membrane may be evaluated based on the permeation flux. The permeation flux is the amount of liquid permeating the zeolite separation membrane per unit time, and a larger permeation flux can be judged to mean that the separation is faster and the practical utility is superior.

EXAMPLES

The present invention will now be explained in greater detail based on examples and comparative examples. However, the invention is not limited to the examples described below.

Example 1

(Production of Zeolite Separation Membrane)

USY zeolite crystals (Si/Al: 7.4; mean particle size: 300 nm) were added to water and stirred to prepare a seed crystal slurry with a USY crystal concentration of 10% by weight. The seed crystal slurry was diluted with water to a USY crystal concentration of 0.25% by weight, and the USY crystals were dispersed in the slurry with a stirrer and ultrasonic disperser. A tubular porous support made of α-alumina (mean pore size: 0.8 μm; outer diameter: 10 mm; inner diameter: 6 mm; length: 10 cm) was immersed in the seed crystal slurry for 3 minutes, and then drawn out at a constant speed. The porous support was dried overnight in a thermostatic bath at 37° C.

Sodium silicate, aluminum hydroxide and distilled water were mixed to yield a reaction solution comprising 1 part by mole of alumina ($Al_2O_3$), 10 parts by mole of silicon dioxide ($SiO_2$), 4.6 parts by mole of sodium oxide ($Na_2O$) and 250 parts by mole of water. After aging the prepared reaction solution for 3 hours, it was placed in a container surrounded by an outer jacket, and the porous support was immersed in the reaction solution. The temperature of the reaction solution at the start of immersion (reaction) was adjusted to 15° C. Immediately after the start of immersion, the temperature of the reaction solution was raised to 102° C. over a period of 30 minutes and then held at 102° C. for 5 hours to form a crude product of a zeolite separation membrane. The obtained crude product was taken out from the reaction solution to afford the zeolite separation membrane. The obtained zeolite separation membrane was washed with water and then immersed overnight in water to elute the alkaline components attached to the zeolite separation membrane. After taking out the zeolite separation membrane from the water, it was dried at 36° C. for 16 hours. The zeolite crystals of the obtained zeolite separation membrane were subjected to elemental analysis with an energy dispersive fluorescent X-ray analyzer, and thereby confirmed to be Y-type zeolite crystals (Si/Al: 2.2).

(Measurement of Separation Factor and Permeation Flux)

A pervaporation (PV) test apparatus shown in FIG. 1 was assembled using the obtained zeolite separation membrane. The PV test apparatus 10 has a container 11 for supply of the liquid mixture to be separated. A conduit 12 for supply of the liquid mixture to the container 11 is connected to the container 11, and a stirrer 13 for stirring of the liquid mixture and a zeolite separation membrane 14 are set in the container 11. A conduit 15 is connected to an open end of the zeolite separation membrane 14, and a vacuum pump 17 is connected to the end of the conduit 15 via a liquid nitrogen trap 16. A vacuum gauge 18 is installed along the conduit 15.

An ethanol/water mixture at 75° C. (ethanol/water (weight ratio)=90/10) (hereinafter referred to as "liquid A") was supplied to the container 11 of the PV test apparatus 10 through the conduit 12, and the interior of the zeolite separation membrane 14 was evacuated with the vacuum pump 17 until the degree of vacuum as displayed by the vacuum gauge 18 was 0.3 kPa. The liquid that had permeated the zeolite separation membrane 14 (hereinafter referred to as "liquid B") was collected at the liquid nitrogen trap 16. The compositions of liquid A and liquid B were measured using a gas chromatograph (GC-14B, Shimadzu Corp.), and the separation factor was determined. The weight of the collected liquid B was measured and the permeation flux (Kg/m$^2$h) was determined.

Comparative Example 1

A zeolite separation membrane was produced in the same manner as in Example 1, except that NaY zeolite crystals (Si/Al: 2.0; mean particle size: 300 nm) were used instead of USY zeolite crystals for preparation of the seed crystal slurry. The separation factor and permeation flux of the obtained zeolite separation membrane were determined in the same manner as in Example 1. The zeolite crystals of the obtained zeolite separation membrane were subjected to elemental analysis in the same manner as in Example 1, and thereby confirmed to be Y-type zeolite crystals (Si/Al: 2.2).

Table 1 shows the results of Example 1 and Comparative Example 1.

TABLE 1

| | Separation factor | Permeation flux (Kg/m$^2$h) |
| --- | --- | --- |
| Example 1 | 1200 | 9.0 |
| Comparative Example 1 | 170 | 7.2 |

As shown in Table 1, the separation factor of the zeolite separation membrane obtained in Example 1 was notably high compared to the zeolite separation membrane obtained in Comparative Example 1. Also, the permeation flux was notably large, and it was sufficiently large even compared to the zeolite separation membrane obtained in Comparative Example 1.

Thus, Example 1 and Comparative Example 1 demonstrate that the zeolite separation membrane obtained by the zeolite separation membrane production process of the invention can satisfactorily separate a mixture of organic solvent and water, and that there are no problems with its practical utility.

INDUSTRIAL APPLICABILITY

The zeolite separation membrane production process of the invention can be employed to produce separation membranes for separation of liquid mixtures, such as mixtures of organic solvent and water.

The invention claimed is:

1. A process for production of a faujasite (FAU) zeolite separation membrane having a porous support and a zeolite layer formed on the surface of, and inside the pores of, the porous support, wherein the porous support has an alumina content of at least 90% with respect to the total weight of the porous support, the process comprising:
    a seed crystal-attaching step in which USY zeolite crystals are attached as seed crystals to the surface of, and inside the pores of, the porous support;
    a crude product-forming step in which: the porous support is contacted with a reaction solution containing silicon and aluminum at a molar ratio of silicon to aluminum (Si/Al) of 1.8 to 12.5, and the reaction solution is heated to form a crude product of the zeolite separation membrane; and
    a crude product-separating step in which the crude product of the zeolite separation membrane is separated from the reaction solution to afford the FAU zeolite separation membrane.

2. The process for production of an FAU zeolite separation membrane according to claim 1, wherein the alumina is selected from the group consisting of α-alumina, β-alumina and γ-alumina.

3. The process for production of an FAU zeolite separation membrane according to claim 1, wherein the mean pore size of the porous support is 0.1 to 20μm.

4. The process for production of an FAU zeolite separation membrane according to claim 1, wherein the porosity of the porous support is 5% to 50%.

5. The process for production of an FAU zeolite separation membrane according to claim 1, wherein a seed crystal slurry containing 0.01% to 20% by weight of USY crystals is contacted with the porous support in the seed crystal-attaching step.

6. The process for production of an FAU zeolite separation membrane according to claim 1, wherein the total amount of silica source and alumina source in the reaction solution is 50% to 99.5% by weight with respect to the total weight of the reaction solution.

7. The process for production of an FAU zeolite separation membrane according to claim 1, wherein the reaction solution is heated to higher than 40° C. in the crude product-forming step.

8. The process for production of an FAU zeolite separation membrane according to claim 1, wherein the crystals of FAU zeolite of the obtained FAU zeolite separation membrane are Y-type zeolite crystals.

9. A method of separating a liquid mixture, comprising the steps of:
    providing an FAU zeolite separation membrane produced by the process for production of an FAU zeolite separation membrane according to claim 1; and
    separating the liquid mixture with the FAU zeolite separation membrane.

* * * * *